(12) United States Patent
Lee et al.

(10) Patent No.: US 9,310,807 B2
(45) Date of Patent: Apr. 12, 2016

(54) METHOD AND SYSTEM FOR CREATING INDOOR ENVIRONMENT MAP

(75) Inventors: Yu-Cheol Lee, Daejeon (KR); Sang Ik Na, Daejeon (KR); Won Pil Yu, Daejeon (KR); Kyu Seo Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1103 days.

(21) Appl. No.: 12/692,113

(22) Filed: Jan. 22, 2010

(65) Prior Publication Data

US 2010/0121488 A1    May 13, 2010

Related U.S. Application Data

(63) Continuation of application No. PCT/KR2008/004090, filed on Jul. 11, 2008.

(30) Foreign Application Priority Data

Jul. 23, 2007  (KR) .................... 10-2007-0073422

(51) Int. Cl.
*G01C 21/32* (2006.01)
*G01S 3/78* (2006.01)
(Continued)

(52) U.S. Cl.
CPC .............. *G05D 1/0274* (2013.01); *G01C 21/32* (2013.01); *G05D 1/024* (2013.01); *G05D 1/0231* (2013.01); *G05D 1/0272* (2013.01); *G05D 2201/0203* (2013.01)

(58) Field of Classification Search
CPC ... G05D 1/0272; G05D 1/0242; G05D 1/024; G05D 1/0248

USPC .......... 700/245–264; 701/408–411, 445–454, 701/461, 466, 472, 495, 498–512, 523, 701/527; 340/998–996, 990, 995.1–995.28; 901/1
See application file for complete search history.

(56) References Cited

U.S. PATENT DOCUMENTS 5,402,051 A  *  3/1995  Fujiwara et al. .............. 318/587
5,896,488 A     4/1999  Jeong
(Continued)

FOREIGN PATENT DOCUMENTS

JP      63-213005       9/1988
KR   10-1997-0033627    7/1997
(Continued)

OTHER PUBLICATIONS

Ingemar J. Cox, "Blanche—An Experiment in Guidance and Navigation of an Autonomous Robot Vehicle", , IEEE Transactions on Robotics and Automation, vol. 7, No. 2, Apr. 1991.
(Continued)

*Primary Examiner* — Khoi Tran
*Assistant Examiner* — Dale Moyer
(74) *Attorney, Agent, or Firm* — Staas & Halsey LLP (57) ABSTRACT

A method of creating an indoor environment map includes acquiring encoded position information by detecting revolutions of wheels when a mobile unit travels using encoders to predict a position of the mobile unit based on the encoded position information, acquiring a measured distance from the mobile unit to an object existing in a surrounding environment using the distance measuring sensor, predicting a position of the mobile unit to be moved, estimating a distance from the mobile unit to the object at the predicted position of the mobile unit, determining whether the estimated distance is matched with the measured distance, correcting the predicted position of the mobile unit to estimate a position of the mobile unit to be moved by the matching of the predicted position with the measured position, and creating the indoor environment map using the corrected position and the measured distance.

14 Claims, 7 Drawing Sheets

(51) Int. Cl.
*G05D 1/02* (2006.01)
*B25J 5/00* (2006.01)

(56) References Cited

U.S. PATENT DOCUMENTS

| | | | | |
|---|---|---|---|---|
| 5,903,124 | A | * | 5/1999 | Kawakami .................... 318/587 |
| 5,961,571 | A | * | 10/1999 | Gorr et al. .................... 701/494 |
| 7,467,115 | B2 | * | 12/2008 | Edelman et al. ................ 706/15 |
| 2005/0182518 | A1 | * | 8/2005 | Karlsson ....................... 700/253 |
| 2005/0234679 | A1 | * | 10/2005 | Karlsson ....................... 702/181 |
| 2007/0027612 | A1 | * | 2/2007 | Barfoot et al. ................ 701/117 |
| 2007/0118248 | A1 | * | 5/2007 | Lee et al. ...................... 700/245 |
| 2007/0150103 | A1 | | 6/2007 | Im et al. |
| 2007/0156286 | A1 | * | 7/2007 | Yamauchi ..................... 700/245 |
| 2011/0141485 | A1 | * | 6/2011 | Lee et al. ...................... 356/614 |

FOREIGN PATENT DOCUMENTS

| | | |
|---|---|---|
| KR | 10-2004-0087171 | 10/2004 |
| KR | 10-2006-0094929 | 8/2006 |
| KR | 10-2007-0039181 | 4/2007 |
| KR | 10-2007-0061218 | 6/2007 |

OTHER PUBLICATIONS

Feng Lu et al., "Robot Pose Estimation in Unknown Environments by Matching 2D Range Scans", IEEE Computer Vision and Patten Recognition Conference (CVPR), 1994.

G. Weiss et al., "A Map based on Laserscans without Geometric Interpretation", Intelligent Autonomous Systems, pp. 403-407, IOS Press, 1995.

* cited by examiner

METHOD AND SYSTEM FOR CREATING INDOOR ENVIRONMENT MAP

This application is a Continuation Application of PCT International Application No. PCT/KR2008/004090 filed on Jul. 11, 2008, which designated the United States.

CROSS-REFERENCE(S) TO RELATED APPLICATIONS

The present invention claims priority of Korean Patent Application No. 10-2007-0073422, filed on Jul. 23, 2007, which is incorporated herein by reference.

FIELD OF THE INVENTION

The present invention relates to a technology of creating an indoor environment map, and more particularly to, method and system for creating an indoor environment map capable of precisely and rapidly acquiring indoor environment and a position of an object existing indoors.

BACKGROUND OF THE INVENTION

There are various scaled outdoor maps of cities, counties, mountains, and the like in the world as civilization is developing, and more precise and detailed outdoor maps are created using a satellite and a global positioning system (GPS) so that the outdoor maps are gradually utilized in more various fields.

In contrast, indoor maps, which may be used in factories, public facilities, hospitals, airports, and the like, are not widely used in actual life at the present time in spite of a variety of applicable fields. This is because there is no a satellite and/or a GPS installed indoor, which makes it impossible to precisely track a location needed to acquire precise map information and hence induces an increase of manufacturing costs for the indoor map.

Meanwhile, since the technology of representing the indoor environment and configuration thereof into a map is applicable to a variety of fields, much research and development is being widely conducted. Particularly, a technology of detecting positions of objects using a distance measuring sensor and of creating an environment map using the detected positions is mainly used. This is because the distance measuring sensor can provide precise information about objects within a very short time interval.

In order to create a precise environment map, the position information acquired by the distance measuring sensor must be determined by a precise correlation. However, since a device such as an indoor GPS and the like is insufficient to measure an absolute position, it is difficult to detect the position information acquired by the distance measuring sensor precisely, and thus much research and development has been conducted to overcome this problem.

A scan matching algorithm as one area of research and development has widely been handled in the academic world. The scan matching algorithm has been developed to overcome, through the use of a matching relationship between information acquired by the distance measuring sensor and an encoded information error that is generated when an object provided with a distance measuring sensor moves from a reference location to another location.

However, since the majority of the scan matching technologies hitherto place the focus on automatically creating a map, there are many exceptional cases in that most of the above-mentioned scan matching technologies cannot be actually used and quality of the created map is not good.

Moreover, the environment recognition technology of a robot does not compensate when the environment recognition is wrong or fails.

SUMMARY OF THE INVENTION

Therefore, it is an object of the present invention to provide a system and method for creating an indoor environment map which is capable of rapidly acquiring an indoor environment map using position information and distance information of a mobile unit.

It is another object of the present invention to provide a system and method for precisely creating an indoor environment map in any environment which is capable of providing technical stability and user convenience.

In accordance with an aspect of the present invention, there is provided a method of creating an indoor environment map using a mobile unit designed to freely travel by employing a plurality of wheels, the mobile unit having a distance measuring sensor and a plurality of encoders mounted to the corresponding wheels, the method including: acquiring encoded position information by detecting revolutions of the wheels using the encoders to predict a position of the mobile unit based on the encoded position information when the mobile unit travels; acquiring a measured distance from the mobile unit to an object existing in a surrounding environment using the distance measuring sensor; predicting a position of the mobile unit to be moved; estimating a distance from the mobile unit to the object at the predicted position of the mobile unit; determining whether or not the estimated distance is matched with the measured distance; correcting the predicted position of the mobile unit to estimate a position of the mobile unit to be moved by the matching of the predicted position with the measured position; and creating the indoor environment map using the corrected position and the measured distance.

In accordance with another aspect of the present invention, there is provided a system for creating an indoor map including: a mobile unit having wheels to freely travel indoors for acquiring a measured distance from the mobile unit to an object existing in a surrounding environment and for acquiring a measured position of the mobile unit when the mobile unit travels; a position prediction unit for predicting a position of the mobile unit to be moved; a distance estimation unit for estimating a distance from the mobile unit to the object at the predicted position; a matching determining unit for determining whether or not the estimated distance is matched with the measured distance to estimate a position of the mobile unit to be moved; a position correcting unit for correcting the predicted position of the mobile unit if it is determined that the predicted position is matched with the measured position; and a map creating unit for creating the environment indoor map according to the corrected position and the measured distance.

In accordance with another aspect of the present invention, there is provided a method of creating an indoor environment map using a mobile unit designed to freely travel by employing a plurality of wheels, the mobile unit having a distance measuring sensor and a plurality of encoders mounted to the corresponding wheels, the method including: acquiring encoded position information by detecting revolutions of the wheels using the encoders to predict a position of the mobile unit based on the encoded position information when the mobile unit travels; acquiring a measured distance from the mobile unit to an object existing in a surrounding environment using the distance measuring sensor; correcting the predicted position by moving the mobile unit to a position corresponding to the measured distance; and creating the indoor environment map using the corrected position and the measured distance.

BRIEF DESCRIPTION OF THE DRAWINGS

The above and other aspects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings.

Figure 1:
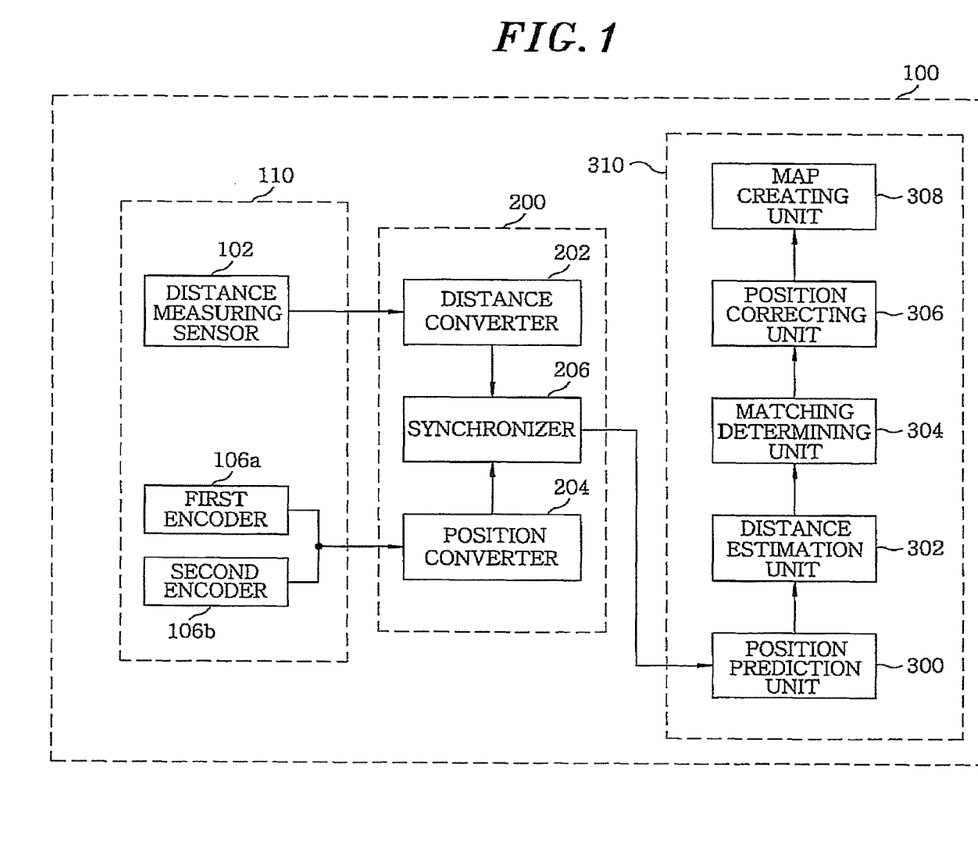
FIG. 1 is a schematic block diagram of a system for creating an indoor environment map using a mobile unit in accordance with an embodiment of the present invention.
Figure 2:
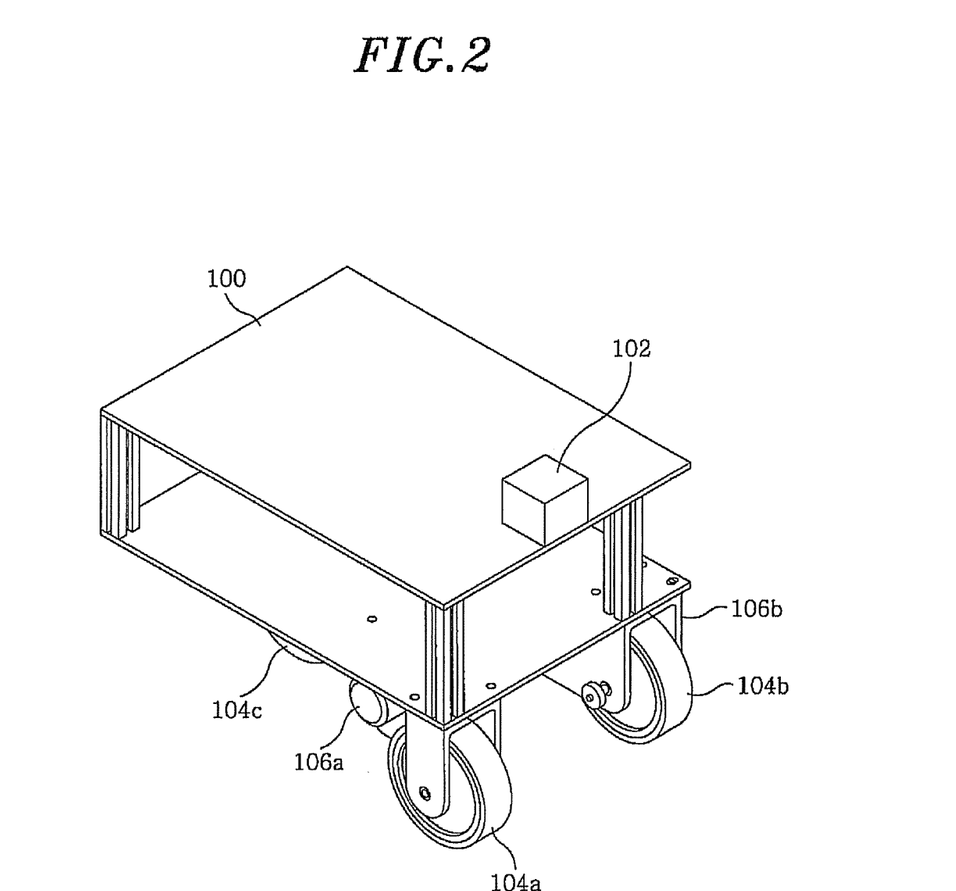
FIG. 2 is a perspective view illustrating the mobile unit shown in FIG. 1.

FIG. 1 is a schematic block diagram of a system for creating an indoor environment map using a mobile unit in accordance with an embodiment of the present invention; and FIG. 2 is a perspective view illustrating the mobile unit shown in FIG. 1.

As shown in FIG. 1, the system for creating an indoor environment map include a mobile unit 100, a signal acquisition section 110, a signal converting section 200 and a signal processing section 310. The signal acquisition section 110, the signal converting section 200 and the signal processing section 310 are mounted on the mobile unit 100.

The mobile unit 100, as illustrated in FIG. 2, is designed to freely travel employing a first wheel 104a, a second wheel 104b and a third wheel 104c. The first, second and third wheels 104a, 104b and 104c allow the mobile unit 100 to freely travel regardless of directions. For example, the first and second wheels 104a and 104b are mounted to the front lower left and right sides of the mobile unit 100, respectively, and the third wheel 104c is mounted to the rear lower side of the mobile unit 100.

The signal acquisition section 110 includes a distance measuring sensor 102, a first encoder 106a and a second encoder 106b. The distance measuring sensor 102 is mounted at a predetermined position on the mobile unit 100 and functions to acquire surrounding environment of the mobile unit 100 traveling indoor. The distance measuring sensor 102 projects a sensor beam toward indoor and receives beam reflected from an object existing in the surrounding environment of the mobile unit 100 to measure a distance from the distance measuring sensor 102 to the object. The distance measuring sensor 102 may be embodied with a laser sensor, an ultrasonic sensor, an infrared sensor, and the like for acquiring information on the surrounding environment and the distance.

The first and second encoders 106a and 106b are mounted to the first and second wheels 104a and 104b and detect revolutions of the wheels 104a and 104b, respectively, to produce encoded position, which represents the distance and the orientation where the mobile unit 100 travels.

The measured distance information acquired by the distance measuring sensor 102 and the encoded position information acquired by the first and second encoders 106a and 106b are sent to the signal converting section 200.

The signal converting section 200 integrally processes the measured distance information and the encoded position information. More specifically, the signal converting section 200 includes a distance converter 202 and a position converter 204 for converting the measured distance information and the encoded position information into digitized distance and position information necessary for processing in the signal processing section. The signal converting section 200 further includes a synchronizer 206 for synchronizing the distance information and the position information. The synchronization avoids an error that may be generated by a difference between acquiring times of the encoded position information and the measured distance information. The synchronized distance and position information is then provided to the signal processing section 310.

The signal processing section 310 includes a position prediction unit 300, a distance estimation unit 302, a matching determining unit 304, a position correcting unit 306, and a map creating unit 308.

Meanwhile, in a case of creating the indoor environment map by using only the acquired information for the mobile unit 100, an error may occur in the position of the mobile unit 100 due to the slip of the wheels 104a and 104b. If the position of the mobile unit 100 with the error is used, a precise indoor environment map may not be created.

Thus, approach to correct the error is required. In this embodiment, an optimal recursive data processing algorithm, e.g., an extended Kalman filter based on a distance measuring sensor is employed to rapidly create the indoor environment map by correcting the erroneous position of the mobile unit 100.

In order to correct the position of the mobile unit 100, there is needed to predict a position of the mobile unit 100 using the encoded position information by the encoders 106a and 106b. The position prediction unit 300 serves to predict a position of the mobile unit 100 by employing the extended Kalman filter algorithm. The prediction performed by the position prediction unit 300 will be explained with reference to FIG. 3.

Figure 3:
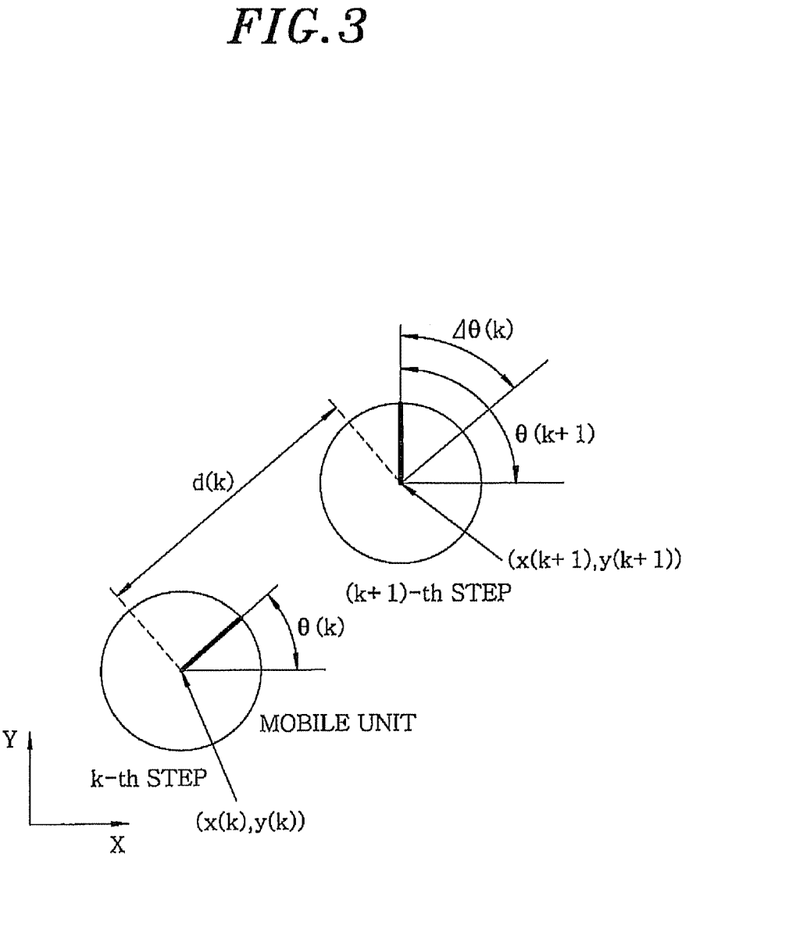
FIG. 3 is a view illustrating a prediction of a position of a mobile unit using encoded information provided from encoders.

As illustrated in FIG. 3, a first stage is to predict a next position of the mobile unit 100 to be moved at a next step from a previous position of the mobile unit 100 at a previous step. In the beginning, a k-th position of the mobile unit 100 in a two dimensional plane can be expressed by the following Equation 1.

$$X(k) = [x(k), y(k), \theta(k)]^T \quad \text{[Equation 1]}$$

Furthermore, in order to obtain how long the mobile unit 100 travels during the prediction of the (k+1)-th position of the mobile unit 100, the encoded position information from the encoders 106*a* and 106*b* is required. As illustrated in FIG. 3, the encoded position information, U(k), is a function of a traveling distance d(k) and a rotation angle Δθ(k) of the mobile unit 100 as expressed in the following Equation 2.

$$U(k)=[d(k), \Delta\theta(k)]^T \qquad \text{[Equation 2]}$$

By using the above Equations 1 and 2, the (k+1)-th position of the mobile unit 100 can be predicted from the geometrical features of the mobile unit 100. If the mobile unit 100 is rotated by Δθ(k) in response to the encoded position information U(k) at the k-th position before being moved by d(k), a (k+1)-th actual position of the mobile unit 100 can be defined by the following Equation 3.

$$X(K+1)=f(X(k), U(k))+v(k), v(k)\sim N(0, Q(k)) \qquad \text{[Equation 3]}$$

where f(X(k),U(k)) is a plant model of the mobile unit 100 and can be expressed by the following Equation 4. Moreover, v(k) expresses a position error of dead reckoning and is expressed by a zero mean Gaussian noise with covariance of Q(k).

$$f(X(k), U(k)) = \begin{pmatrix} x(k) + d(k)\cos\theta(k) \\ y(k) + d(k)\sin\theta(k) \\ \theta(k) + \Delta\theta(k) \end{pmatrix} \qquad \text{[Equation 4]}$$

Since an actual position x(k+1) is unknown due to an error occurred by the slip of the wheels 104*a* and 104*b* of the mobile unit 100 on the ground, the actual position can only be estimated from the following Equation 5 through a k-th estimated position X(k|k) and the encoded position information U(k).

$$\hat{X}(k+1\mid k) = f(\hat{X}(k\mid k), U(k)) \qquad \text{[Equation 5]}$$

$$= \begin{pmatrix} \hat{x}(k) + d(k)\cos\hat{\theta}(k) \\ \hat{y}(k) + d(k)\sin\hat{\theta}(k) \\ \hat{\theta}(k) + \Delta\theta(k) \end{pmatrix}$$

An error between the predicted position defined by Equation 5 and the actual position defined by Equation 3 is expressed in the form of covariance. In this case, $\hat{X}(k|k)$ is an estimated value, but U(k) is an actual information having a definite value. Thus, when Equation 3 is expressed by Taylor series based on the (k+1)-th estimated position $\hat{X}(k|k)$, the (k+1)-th actual position is expressed by following Equation 6.

$$X(k+1\mid k) = f(\hat{X}(k\mid k), U(k)) + \qquad \text{[Equation 6]}$$
$$\frac{\partial f}{\partial X}[X(k) - \hat{X}(k\mid k)] + \text{high order term} + v(k)$$

If Equation 6 is linearized by neglecting high order terms except for the first order term, Equation 6 can be expressed by the following Equation 7.

$$[\text{Equation}] X(k+1|k)=f(\hat{X}(k|k),U(k)) +\nabla f\cdot[X(k)-\hat{X}(k|k)]+v(k) \qquad 7$$

In Equation 7, ∇f is a Jacobian matrix of Equation 5 and is identical to the following Equation 8.

$$\nabla f = \begin{bmatrix} \frac{\partial f_1}{\partial \hat{x}} & \frac{\partial f_1}{\partial \hat{y}} & \frac{\partial f_1}{\partial \hat{\theta}} \\ \frac{\partial f_2}{\partial \hat{x}} & \frac{\partial f_2}{\partial \hat{y}} & \frac{\partial f_2}{\partial \hat{\theta}} \\ \frac{\partial f_3}{\partial \hat{x}} & \frac{\partial f_3}{\partial \hat{y}} & \frac{\partial f_3}{\partial \hat{\theta}} \end{bmatrix} \qquad \text{[Equation 8]}$$

$$= \begin{bmatrix} 1 & 0 & -d(k)\sin(\hat{\theta}(k)) \\ 0 & 1 & d(k)\cos(\hat{\theta}(k)) \\ 0 & 0 & 1 \end{bmatrix}$$

When the predicted position of Equation 5 is subtracted from the actual position linearized in Equation 7, the position estimation error $\tilde{X}(k+1|k)$ can be obtained by the following Equation 9.

$$\tilde{X}(k+1\mid k) = X(k+1\mid k) - \hat{X}(k+1\mid k) \qquad \text{[Equation 9]}$$
$$= \nabla f \cdot [X(k) - \hat{X}(k\mid k)] + v(k)$$
$$= \nabla f \cdot \tilde{X}(k\mid k) + v(k)$$

When the position estimation error of Equation 9 is expressed by a covariance matrix, the position estimation error is identical to C(k+1|k) of the following Equation 10.

$$C(k+1|k)=E\lfloor \tilde{X}(k+1|k)\tilde{X}^T(k+1|k)\rfloor=\nabla f\cdot E\lfloor \tilde{X}(k|k)$$
$$\tilde{X}^T(k|k)\rfloor\cdot\nabla f^T+\nabla f\cdot E\lfloor \tilde{X}(k|k)v(k)^T\rfloor+E\lfloor v(k)$$
$$\tilde{X}^T(k|k)\rfloor\cdot\nabla f+E\lfloor v(k)v(k)^T\rfloor \qquad \text{[Equation 10]}$$

In Equation 10, E[ ] are linear operators. Since v(k) is not uncorrelated with $\tilde{X}(k)$, the first term and the last term remain so that C(k+1|k) is expanded as the following Equation 11.

$$C(k+1|k)=\nabla f\cdot E\lfloor \tilde{X}(k|k)\tilde{X}^T(k|k)\rfloor\cdot\nabla f^T E\lfloor v(k)v(k)^T\rfloor \qquad \text{[Equation 11]}$$

In Equation 11, $E\lfloor \tilde{X}(k|k)\rfloor$ is a covariance matrix of a k-th position error, and $E\lfloor v(k)v(k)^T\rfloor$ is expressed by a covariance matrix Q(k) for expressing a position error of dead reckoning so that C(k+1|k) can be finally expressed by the following Equation 12.

$$C(k+1|k)=\nabla f\cdot C(k|k)\cdot\nabla f^T+Q(k) \qquad \text{[Equation 12]}$$

Equation 12 contains physical meaning that the uncertainty of the (k+1)-th position of the mobile unit 100 has a relationship in which uncertainty of the k-th position thereof geometrically varies by $\nabla f\cdot C(k|k)\cdot\nabla f^T$ and uncertainty Q(k) caused by the control inputs of the traveling distance d(k) and the rotation angle Δθ(k) is added to the uncertainty of the (k+1)-th position of the mobile unit.

Referring again FIG. 1, the distance estimation unit 302 estimates the measured distance by the distance measuring sensor 102 using a measurement model at the predicted position of the mobile unit 100 obtained by the position prediction unit 300 in order for the position correction of the mobile unit 100.

Figure 4:
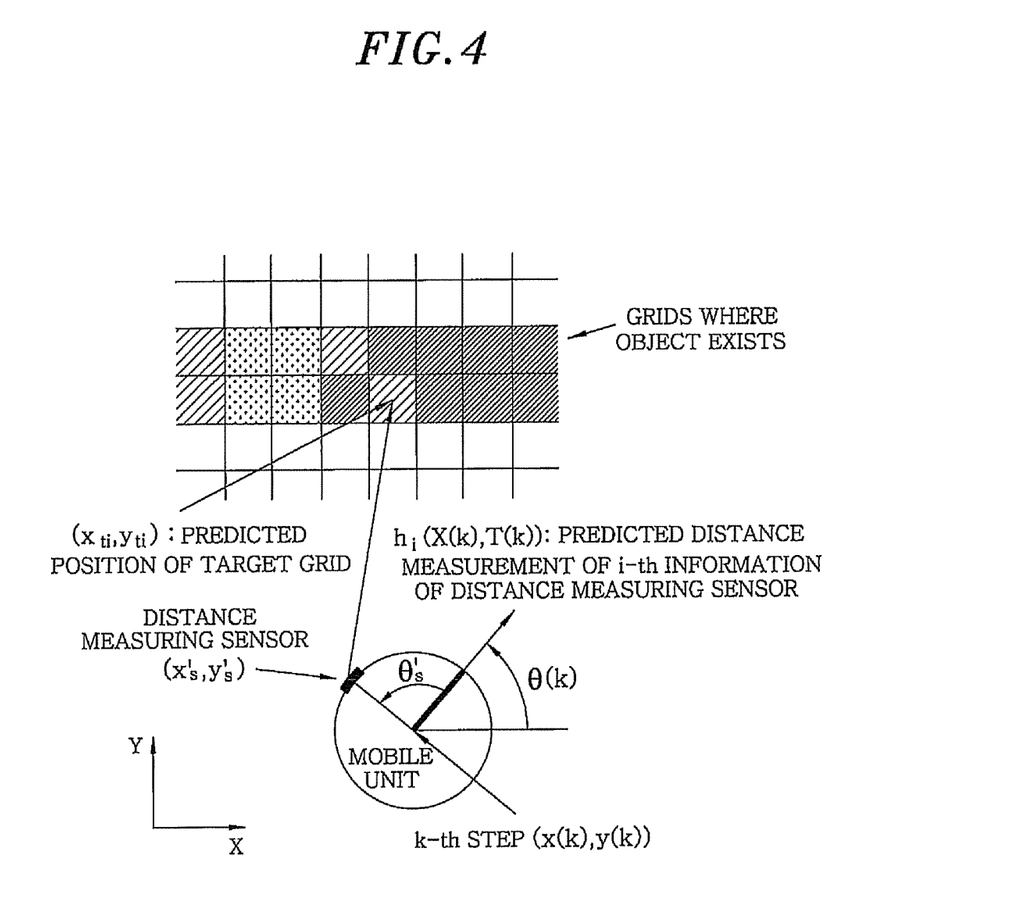
FIG. 4 is a view illustrating an operation performed by the distance estimation unit shown in FIG. 1.

FIG. 4 is a view illustrating an operation performed by the distance estimation unit 302. In this drawing, a position of the distance measuring sensor 102 is defined by a local coordinate $\lfloor x'_s, y'_s, \theta'_s \rfloor$ based on the center of the mobile unit 100. The local coordinate can be converted into a global coordinate based on an origin of the indoor environment map and is expressed by the following Equation 13.

$$\begin{bmatrix} x_s(k) \\ y_s(k) \\ \theta_s(k) \end{bmatrix} = \begin{bmatrix} x(k) + x'_s \cos\theta(k) - y'_s \sin\theta(k) \\ y(k) + x'_s \sin\theta(k) - y'_s \cos\theta(k) \\ \theta(k) + \theta'_s \end{bmatrix} \quad \text{[Equation 13]}$$

In the present invention, the indoor environment map is represented as a grid map in which the surrounding environment is divided into several grids in the form of chessboard and probability is assigned to each grid where the object exists.

In FIG. 4, shaded grids in the indoor environment map denote positions of an object obtained by the distance measuring sensor 102. A position of a grid which depicts a position of the object to be detected through i-th information of the distance measuring sensor 102 can be defined by the following Equation 14.

$$T(k) = \{(x_{ti}(k), y_{ti}(k))\} \quad \text{[Equation 14]}$$

In Equation 14, T(k) represents the position of the object detected by the i-th information of the distance measuring sensor 102, wherein $x_{ti}(k)$ and $y_{ti}(k)$ are an X-axis position and a Y-axis position, respectively, of the object in terms of the global coordinate that is detected by the i-th information of the distance measuring sensor 102.

In this case, if it is assumed that the distance measuring sensor 102 projects i-th beam, the projected beam is reflected by a grid where a nearest object exists. This is expressed by Equation 15 and becomes the measurement model.

$$h_i(X(k), T(k)) = \sqrt{(x_s(k) - x_{ti}(k))^2 + (y_s(k) - y_{ti}(k))^2} \quad \text{[Equation 15]}$$

In Equation 15, $h_i(X(k), T(k))$ is an estimated distance of the i-th beam from the distance measuring sensor 102. Here, $x_s(k)$ and $y_s(k)$ represent X-axis and Y-axis positions of the distance measuring sensor 102, respectively, in terms of the global coordinate; and $x_{ti}(k)$ and $y_{ti}(k)$ are estimated X-axis and Y-axis positions of an estimated object, respectively, in terms of the global coordinate.

Using the measurement model defined by Equation 15, the measurement of the i-th beam of the distance measuring sensor 102 at the predicted position of the mobile unit 100 can be estimated by the following Equation 16.

$$\hat{z}_i(k+1|k) = h_i(\hat{X}(k+1|k), T(k+1)) \quad \text{[Equation 16]}$$

In Equation 16, $\hat{z}_i(k+1|k)$ is an estimated distance of the i-th beam at the (k+1)-th predicted position of the mobile unit 100. Here, $\hat{X}(k+1|k)$ is a (k+1)-th predicted position of the mobile unit 100 at the k-th position of the mobile unit 100, T(k+1) represents a position of the object that can be detected by the i-th information at the (k+1)-th predicted position of the mobile unit 100.

The matching determining unit 304 determines whether or not the estimated distance of Equation 16 from the distance estimation unit 302 matches the actual distance from the distance measuring sensor 102. In other words, the matching determining unit 304 obtains a difference between the estimated distance and the actual distance to determine whether or not the estimated distance is valid.

More specifically, referring to FIG. 4, the actual distance of the i-th information can be defined by the following Equation 17.

$$z_i(k) = h_i(X(k), T(k)) + w_i(k) \sim N(0, R_i(k)) \quad \text{[Equation 17]}$$

In Equation 17, X(k) represents the position of the mobile unit 100, T(k) represents a position where the object will be detected in the grid map, $h_i$ represents a distance, and $w_i(k)$ represents a measurement error of the distance measuring sensor 102. If the i-th beam is projected from the distance measuring sensor 102 at the position X(k) of the mobile unit 100, a value, in which the measurement error $w_i(k)$ of the distance measuring sensor is added to the distance $h_i$ at the position T(k), becomes the measured distance. The measurement error $w_i(k)$ is expressed by Gaussian noise with a mean 0 (zero) and covariance $R_i(k)$. If Equation 17 is applied to the predicted position $\hat{X}(l+1|k)$, Equation 17 can be expanded with respect to the predicted position $\hat{X}(k+1|k)$ in the form of Taylor series by the following Equation 18.

$$z_i(k+1) = \quad \text{[Equation 18]}$$
$$h_i(\hat{X}(k+1|k), T(k+1)) + \frac{\partial h_i}{\partial X}[\hat{X}(k+1|k) - X(k+1)] +$$
$$\text{high order term} + w_i(k+1)$$

When Equation 18 is linearized by neglecting high order terms except for the first order term, Equation 18 can be expressed by the following Equation 19.

$$z_i(k+1) = h_i(\hat{X}(k)+1|k), T(k+1)) + \nabla h_i \cdot [\hat{X}(k+1|k) - X(k+1)] + w_i(k+1) \quad \text{[Equation 19]}$$

In Equation 19, $\nabla h_i$ is a Jacobian matrix of Equation 5 and is identical to the following Equation 20.

$$\nabla h_i = \frac{1}{d} \begin{bmatrix} \hat{x}_s - x_{ti} \\ \hat{y}_s - y_{ti} \\ \begin{bmatrix} (x_{ti} - \hat{x}_s)(x'_s \sin\hat\theta) + y'_s \cos\hat\theta + \\ (y_{ti} - \hat{y}_s)(-x'_s \cos\hat\theta) + y'_s \sin\hat\theta \end{bmatrix} \end{bmatrix}^T \quad \text{[Equation 20]}$$

In Equation 20, 'd' is a distance from the estimated position of the distance measuring sensor 102 to a position of the grid where the closest object exists. In order to determine whether or not the estimated distance measurement is valid, an innovation, as expressed by the following Equation 21, is obtained from a difference between the estimated distance measurement of Equation 16 and the actual distance measurement of Equation 19.

$$\tilde{z}_i(k+1) = z_i(k+1) - \hat{z}(k+1|k) \quad \text{[Equation 21]}$$
$$= \nabla h_i \cdot [X(k+1|k) - \hat{X}(k+1|k)] + w_i(k+1)$$
$$= \nabla h_i \cdot \tilde{X}(k+1|k) + w_i(k+1)$$

A covariance matrix of the innovation obtained from Equation 21 is identical to $s_i(k+1)$ of the following Equation 22.

$$s_i(k+1) = E[\tilde{z}_i(k+1)\tilde{z}_i^T(k+1)] \quad \text{[Equation 22]}$$
$$= \nabla h_i \cdot E[\tilde{X}(k+1|k)\tilde{X}^T(k+1|k)] \cdot$$
$$\nabla h_i^T + \nabla h_i \cdot E[\tilde{X}(k+1|k)w_i(k+1)^T] +$$
$$E[w_i(k+1)\tilde{X}^T(k+1|k)] \cdot \nabla h_i^T +$$
$$E[w_i(k+1)w_i(k+1)^T]$$

In Equation 22, E[ ] are linear operators. Since $w_i(k+1)$ is uncorrelated with $X(l+1|k)$, the first term and the last term remain so that $s_i(k+1)$ is expanded as the following Equation 23.

$$s_i(k+1) = \nabla h_i \cdot E[X(k+1|k)] \cdot \nabla h_i^T + E[w_i(k+1)w_i(k+1)^T] \quad \text{[Equation 23]}$$

In Equation 23, $E[X(k+1|k)X^T(k+1|k)]$ is a covariance matrix $C(k+1|k)$ of the predicted position of the mobile unit 100, and $E[w_i(k+1)w_i(k+1)^T]$ is a covariance matrix $R_i(k+1)$ for expressing the measuring error of the distance measuring sensor 102. Therefore, $x_i(k+1)$ can be expressed as the following Equation 24.

$$s_i(k+1) = \nabla h_i \cdot C(k+1|k) \cdot \nabla h_i^T + R_i(k+1) \quad \text{[Equation 24]}$$

Whether or not the estimated distance has a good match with the actual distance is determined by the following Equation 25 by using the innovations and the covariance matrices of Equations 21 and 24.

$$z_i(k+1)s_i^{-1}(k+1)z_i^T(k+1) \leq e^2 \quad \text{[Equation 25]}$$

In Equation 25, 'e' is a boundary error, which is a predetermined parameter. If Equation 25 is satisfied, it means that the matching is successful. Since several distance information are used at the same time in this embodiment of the present invention, a composite innovation is expressed by the following Equation 26 if there are n-number of distance information satisfying the Equation 25.

$$Z(k+1) = \begin{bmatrix} z_1(k+1) - \hat{z}_1(k+1|k) \\ \vdots \\ z_n(k+1) - \hat{z}_n(k+1|k) \end{bmatrix} \quad \text{[Equation 26]}$$

A Jacobian value of a composite measurement model of the distance measuring sensor 102 is also expressed by the following Equation 27.

$$\nabla H = \begin{bmatrix} \nabla h_1 \\ \vdots \\ \nabla h_n \end{bmatrix} \quad \text{[Equation 27]}$$

A covariance matrix of the composite innovation expressed by the following Equation 26 can be obtained using Equation 27.

$$S(k+1) = \nabla H \cdot C(k+1|k) \cdot \nabla H^T + R(k+1), R(k+1) = \text{diag}\{R_i(k+1)|1 \leq i \leq n\} \quad \text{[Equation 28]}$$

In Equation 28, R(k+1) is Gaussian noise of the n-number of sensor information.

On the other hand, the position correcting unit 306 corrects the position information of the mobile unit 100 using the composite innovation of Equation 26 that is obtained by the matching determining unit 304. More specifically, the position correcting unit 306 performs a position correction for the mobile unit 100 such that the predicted position of the mobile unit 100 and the covariance matrix of the predicted position are updated using the previously obtained composite innovation. In this case, well-known Kalman gain is expressed by the following Equation 29.

$$W(k+1) = C(k+1|k)\nabla H^T S^{-1}(k+1) \quad \text{[Equation 29]}$$

The predicted position of the mobile unit 100 and the covariance matrix of the predicted position are updated by the following Equations 30 and 31 using the covariance matrix of the composite innovation of Equation 28 and the Kalman gain of Equation 29.

$$\hat{X}(k+1|k+1) = \hat{X}(k+1|k) + W(k+1)Z(K+1) \quad \text{[Equation 30]}$$

$$C(k+1|k+1) = C(k+1|k) - W(k+1)S(K+1)W^T(k+1) \quad \text{[Equation 31]}$$

Finally, the map creating unit 308 creates the indoor environment map according to the corrected position of the mobile unit 100 and the covariance matrix performed by the position correcting unit 305. In other words, when the predicted position of the mobile unit 100 is corrected by the above-mentioned operations, the map creating unit 308 rapidly creates the indoor environment map by depicting therein the position of the object using the corrected position and the measured distance.

Figure 5:
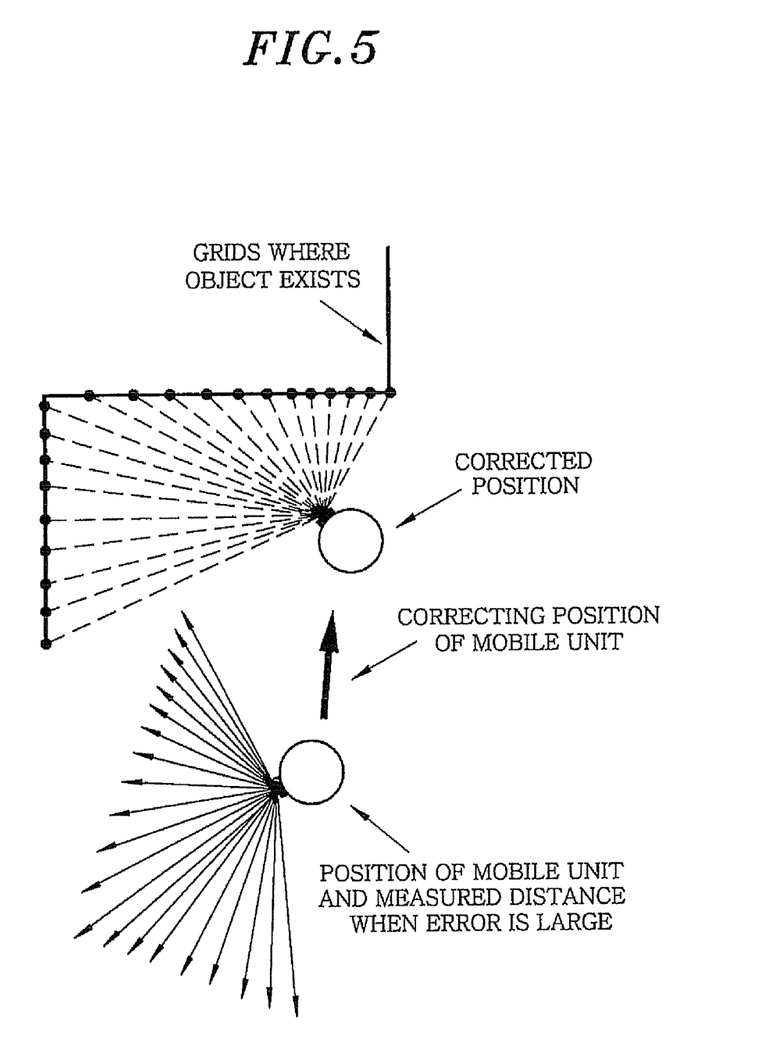
FIG. 5 is a view illustrating a manual correcting method of a position of a mobile unit using a grid map and distance information when an error is large during the correction of the position of the mobile unit using an extended Kalman filter.

However, if the correction is not completed by the algorithm as described above, the mobile unit 100 may be moved manually to a position to be matched with the measured distance by the distance measuring sensor 102 as illustrated in FIG. 5. By using this manual operation, the position of the mobile unit 100 can be rapidly and precisely corrected and the indoor environment map can be easily created.

In a case of creating the indoor environment map only with the encoded position information of the mobile unit 100, there may occur an error in the position of the mobile unit 100 due to the slip of the wheels. Thus, in order to remedy the same, the present invention has been described to employ the extended Kalman filter algorithm.

Alternatively, there is proposed another method of creating a more precise indoor environment map at any place although it is slow to create the indoor environment map. According to this method, a user manually corrects the position of the mobile unit 100 throughout whole operations using the distance information acquired at respective positions of the mobile unit 100, which will be described with reference to FIG. 6.

Figure 6:
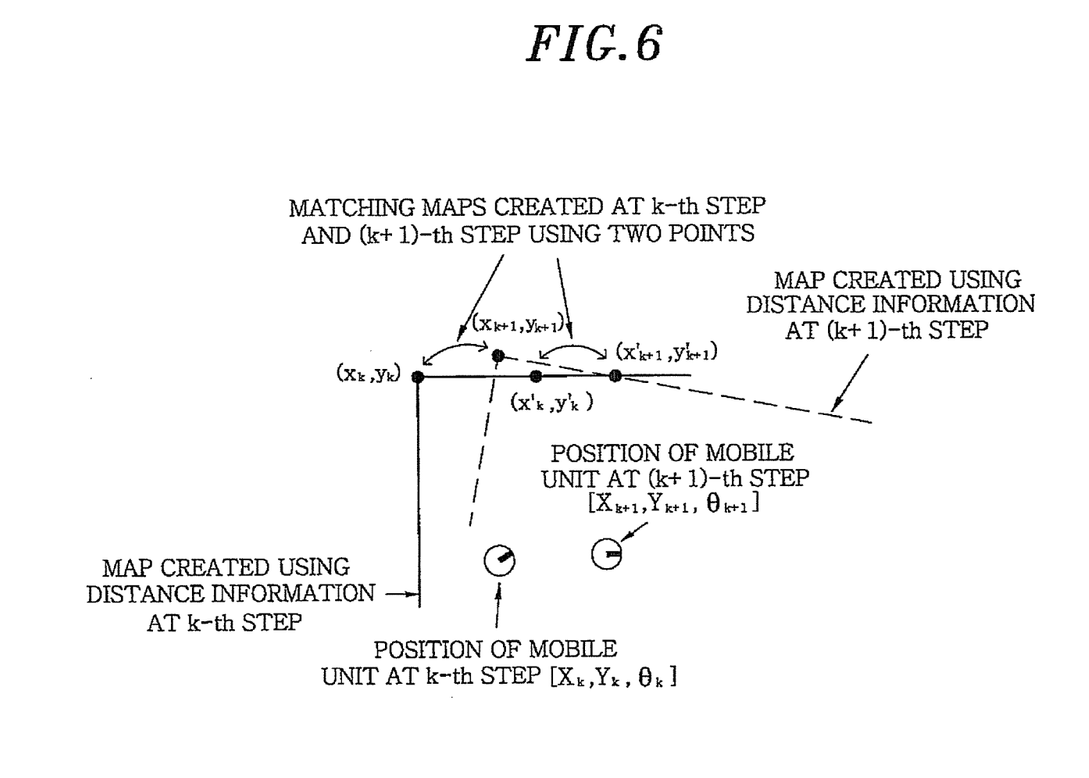
FIG. 6 is a view illustrating an operation of coupling maps with each other by matching two points with each other manually.

Referring to FIG. 6, by using respective two points matched between a map created using the distance information at a k-th step and a map created using the distance information at the (k+1)-th step, the maps created at the two steps are coupled to thereby create a final environment map.

In this case, if it is assumed that two points matched with each other at the k-th step are $(x_k, y_k)$ and $(x'_k, y'_k)$ respectively, and two points matched with each at the (k+1)-th step are $(x_{k+1}, y_{k+1})$ and $x'_{k+1}, y'_{k+1}$), respectively, the position of the mobile unit 100 at the (k+1)-th step can be obtained from the position $[X_k, Y_k, \theta_k]$ of the mobile unit 100 at the k-th step by using the following Equations 32 to 34. The maps created over the k-th to the (k+1)-th step are matched with each other to create a precise indoor environment map using the position of the mobile unit 100 at the (k+1)-th step.

$$X_{k+1} = X_k + (x_{k+1} - x_k) \quad \text{[Equation 32]}$$

-continued $$Y_{k+1} = Y_k + (y_{k+1} - y_k)$$ [Equation 33]

$$\theta_{k+1} = \theta_k + \left(\tan^{-1}\frac{y'_{k+1} - y_{k+1}}{x'_{k+1} - x_{k+1}} - \tan^{-1}\frac{y'_k - y_k}{x'_k - x_k}\right)$$ [Equation 34]

The Equations 32, 33, and 34 are to obtain the position of the mobile unit at the (k+1)-th step, wherein $(x_k, y_k)$ and $(x'_k, y'_k)$ are positions at the two points among the k-th distance information of the mobile unit 100, $(x_{k+1}, y_{k+1})$ and $(x'_{k+1}, y'_{k+1})$ are the (k+1)-th distance information to be matched with $(x_k, y_k)$ and $(x'_k, y'_k)$, $X_k, Y_k, \theta_k$ represents the position of the mobile unit 100 at the k-th step, and $X_{k+1}, Y_{k+1}, \theta_{k+1}$ represents the position of the mobile unit 100 at the (k+1)-th step.

Hereinafter, a method of creating an indoor environment map in accordance with the present invention having the above-mentioned structure will be described in detail with reference to FIG. 7.

Figure 7:
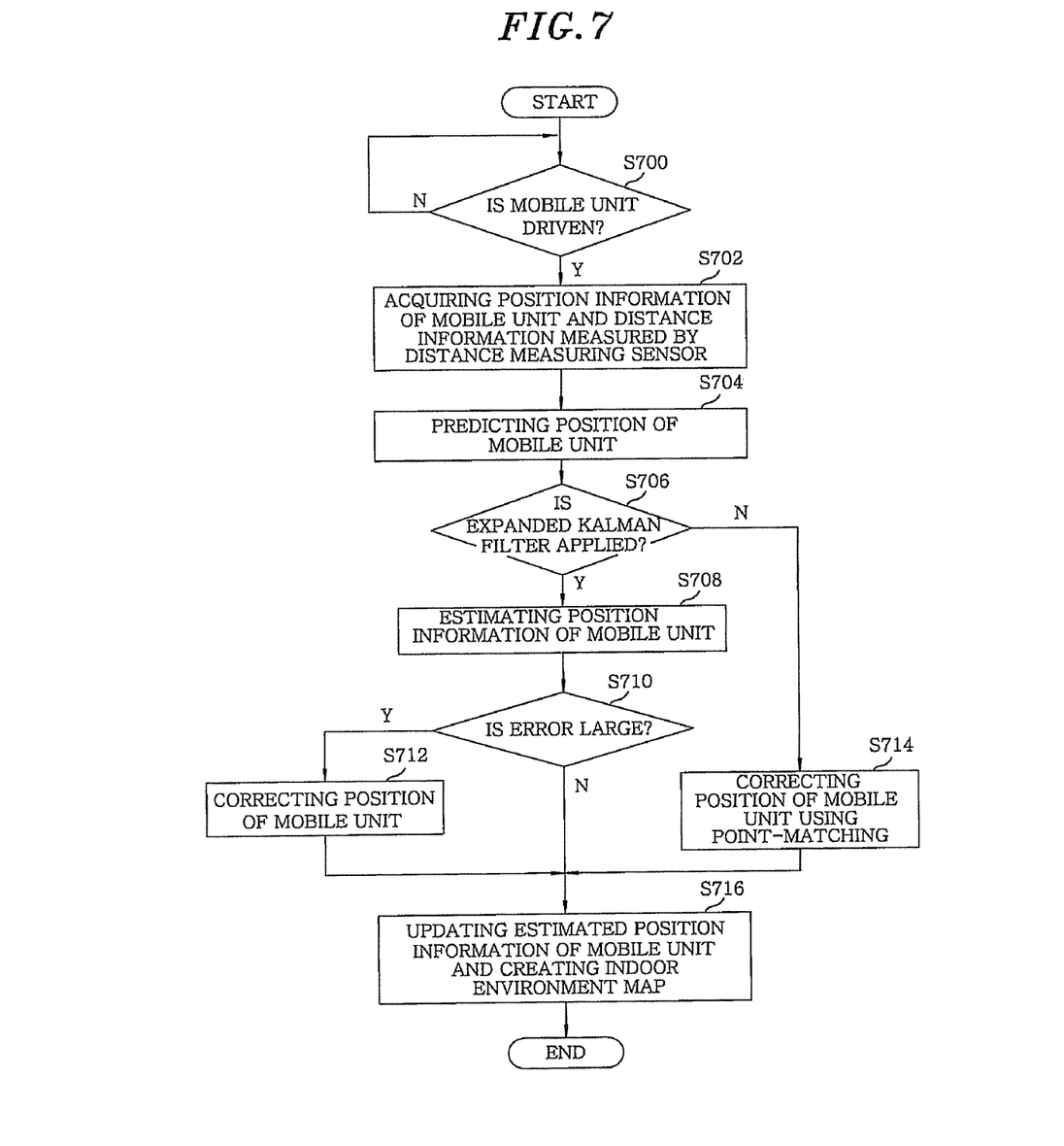
FIG. 7 is a flowchart illustrating an operation of creating an indoor environment map in accordance with embodiment of the present invention.

As shown in FIG. 7, in step S700, as the mobile unit 100 is driven, the respective wheels 104a, 104b, and 104c of the mobile unit 100 rotate.

In step S702, the first and second encoders 106a and 106b that are mounted to the first and second wheels 104a and 104b, respectively, detect revolutions of the wheels 104a and 104b, respectively, to thereby acquire encoded position information of the mobile unit 100. At the same time, the distance measuring sensor 102 of the mobile unit 100 acquires the distance information from the distance measuring sensor 102 to an object existing in the surrounding environment at the position of the mobile unit 100. The encoded position information from the first and second encoders 106a and 106b and the distance information from the distance measuring sensor 102 are then provided to the signal processing section 310 through the signal converting unit 200.

After that, in step S704, the position prediction unit 300 predicts the position of the mobile unit 100 using the encoded position information from the first and second encoders 106a and 106b.

In step S706, it is determined whether the extended Kalman filter is applied or not. In a case of rapidly creating the indoor environment map using the extended Kalman filter, a control process goes to step S708 where the position of the mobile unit 100 is estimated by the position correcting unit 306 employing the extended Kalman filter. That is, in the step S708, the position of the mobile unit 100 is estimated to correct the predicted position of the mobile unit 100 through the use of the extended Kalman filter in accordance with the present invention.

Thereafter, in step S710, the matching determining unit 304 determines whether or not an error in the corrected position of the mobile unit 100 is large. That is, the matching determining unit 304 determines whether or not the estimated distance is matched with the measured distance. In step S710, if it is determined that the error in the corrected position of the mobile unit 100 is large, that is, it is determined that the estimated distance is not matched with the measured distance, a control process advances to step S712 where the predicted position of the mobile unit 100 is corrected manually to rapidly and precisely create the indoor environment map.

If, however, in step S710, it is determined that there is no error in the corrected position of the mobile unit 100, a control process goes to step S716. In step S716, the corrected position of the mobile unit 100 is then provided to the map creating unit 308 where the indoor environment map depicting the position of the object is created using the corrected position of the mobile unit 100 and the distance measured by the distance measuring sensor 102 at the corrected position.

Meanwhile, if it is determined in the step S706 that the extended Kalman filter is not employed, a control process goes to step S714 where the predicted position of the mobile unit 100 is precisely corrected by manually point-matching using the actual distance measured by the distance measuring sensor 102 at the respective positions of the mobile unit 100. The position correcting method using the point-matching has been illustrated in FIG. 6, and this method is not rapid in comparison to the extended Kalman filter but can guarantee precision at any place. Subsequently, a control process will then advance to the step S716 as set forth above.

As described above, according to the present invention, an indoor environment map is rapidly created through the extended Kalman filter algorithm, or a precise indoor environment map is created at any place through the manual point-matching.

According to the present invention, an indoor environment map in which a mobile unit or an operator recognizes surrounding environment in public facilities, hospitals, airports, and the like can be rapidly and precisely created. For example, when the present invention is employed in a mobile robot, information on the surrounding environment is provided to the mobile robot so that the information may be used to create an optimal shortest path to the mobile robot. Moreover, the configuration and features of the public facilities and other indoor spaces are easily created to be used for the purpose of guiding indoor paths. A construction company may employ the present invention to rapidly and precisely create and recognize actual configuration of a building in order to check whether indoor configuration of a constructed building matches construction drawings.

While the invention has been shown and described with respect to the preferred embodiments, it will be understood by those skilled in the art that various changes and modifications may be made without departing from the scope of the invention as defined in the following claims.

What is claimed is:

1. A system for creating an indoor environment map, comprising:
    a mobile unit, having wheels to freely travel, the mobile unit having a distance measuring beam sensor and a plurality of encoders mounted to the corresponding wheels, the mobile unit acquiring encoded information by detecting revolutions of the wheels using the plurality of encoders when the mobile unit travels, the mobile unit measuring a distance from the mobile unit to an object existing in a surrounding environment using the distance measuring beam sensor when the mobile unit travels;
    a position prediction unit predicting a position of the mobile unit based on the encoded information and determining whether or not to correct the position of the mobile unit by applying an extended Kalman filter; and
    wherein the position of the mobile unit is corrected manually by using the measured distance when an extended Kalman filter is not applied;
    map creating unit creating the indoor environment map using the corrected position of the mobile unit.

2. The system of claim 1, further comprising:
    a synchronizer for synchronizing the encoded information and the measured distance.

3. The system of claim 1, comprising:
    a position prediction unit for predicting a position of the mobile unit based on the encoded information, and
    the position prediction unit employs an extended Kalman filter to predict the position of the mobile unit.

4. The system of claim 1, wherein the indoor environment map comprises a grid map in which the surrounding environment is divided into several grids in a form of chessboard and probability is assigned to each grid where the object exists.

5. A method of creating an indoor environment map comprising:
   providing a mobile unit designed to freely travel by employing a plurality of wheels, the mobile unit having a distance measuring beam sensor and a plurality of encoders mounted to the corresponding wheels;
   acquiring encoded information by detecting revolutions of the wheels using the encoders when the mobile unit travels;
   measuring a distance from the mobile unit to an object existing in a surrounding environment using the distance measuring beam sensor when the mobile unit travels;
   predicting a position of the mobile unit based on the encoded information and determining whether or not to correct the position of the mobile unit by applying an extended Kalman filter;
   correcting the position of the mobile unit manually by using the measured distance when an extended Kalman filter is not applied; and
   creating the indoor environment map using the corrected position of the mobile unit.

6. The method of claim 5, wherein said creating the indoor environment map includes coupling maps created through use of a distance from the mobile unit to the object at a k-th step and a (k+1)-th step using two points matched between the maps to create the indoor environment map.

7. The method of claim 6, wherein the position of the mobile unit at the (k+1)-th step is obtained from the position $([X_k, Y_k, \theta_k])$ of mobile unit at the k-th step using following Equations $$X_{k+1} = X_k + (x_{k+1} - x_k),$$

$$Y_{k+1} = Y_k + (y_{k+1} - y_k),$$
and $$\theta_{k+1} = \theta_k + \left(\tan^{-1}\frac{y'_{k+1} - y_{k+1}}{x'_{k+1} - x_{k+1}} - \tan^{-1}\frac{y'_k - y_k}{x'_k - x_k}\right)$$

where $(x_k, y_k)$ and $(x'_k, y'_k)$ are positions of the two points at the k-th step, $(x_{k+1}, y_{k+1}, \theta_{k+1})$ and $(x'_{k+1}, y'_{k+1})$ are positions at the (k+1)-th step, $X_k, Y_k, \theta_k$ is the position of the mobile unit at the k-th step, and $X_{k+1}, Y_{k+1}, \theta_{k+1}$ represents a position of the mobile unit at the (k+1)-th step.

8. The method of claim 5, further comprising synchronizing the encoded information and the measured distance.

9. The method of claim 5, comprising: predicting a position of the mobile unit based on the encoded information, and wherein the predicted position is obtained by applying an extended Kalman filter employing a grid map based on the encoded information and the measured distance, wherein the grid map has an estimation detecting grid denoting a position of the object existing in surrounding environment.

10. The method of claim 9, wherein an estimated distance is obtained from estimation of i-th information from the distance measuring beam sensor, and a position of the estimation detecting grid, T(k), of the object detected by the i-th information is defined by Equation $T(k) = \{(x_{ti}(k), y_{ti}(k))\}$,
   where $x_{ti}(k)$ and $Y_{ti}(k)$ are an X-axis position and a Y-axis position, respectively, of the object in terms of global coordinate that is detected by the i-th information of the distance measuring beam sensor.

11. The method of claim 10, wherein, when the distance measuring beam sensor projects an i-th beam, a measurement model of the estimation detecting grid where a nearest closest object exists is defined by the Equation $$h_i(X(k),T(k))=\sqrt{(x_s(k)-x_{ti}(k))^2+(y_s(k)-y_{ti}(k))^2}$$

where $h_i(X(k),T(k))$ is an estimated distance of the i-th beam from the distance measuring beam sensor; $x_s(k)$ and $y_s(k)$ represent an X-position and a Y-position of the distance measuring beam sensor, respectively, in terms of the global coordinate; and $x_{ti}(k)$ and $y_{ti}(k)$ are estimated X-axis and Y-axis positions of an estimated object, respectively, in terms of global coordinate.

12. The method of claim 11, wherein the i-th information estimated by using the measurement model is defined by the Equation $$\hat{z}_i(k+1|k)=h_i(\hat{X}(k+1|k),T(k+1))$$

where $\hat{z}_i(k+1|k)$ is an estimated distance of the i-th beam from the distance measuring beam sensor at a (k+1)-th predicted position of the mobile unit, $\hat{X}(k+1|k)$ is the (k+1)-th predicted position of the mobile unit at a k-th position of the mobile unit, and T(k +1) is a position of the object detected by the i-th information of the distance measuring beam sensor at the (k+1)-th predicted position of the mobile unit.

13. The method of claim 5, wherein the indoor environment map comprises a grid map in which the surrounding environment is divided into several grids and probability is assigned to each grid where the object exists.

14. The method of claim 5, further comprising predicting a position of the mobile unit based on the encoded information, and moving the mobile unit to a position corresponding to the measured distance to create the indoor environment map using the moved position of the mobile unit and the measured distance, when the predicted position does not matched with the measured distance.

* * * * *